REGULATED POWER SUPPLY
Filed July 25, 1966
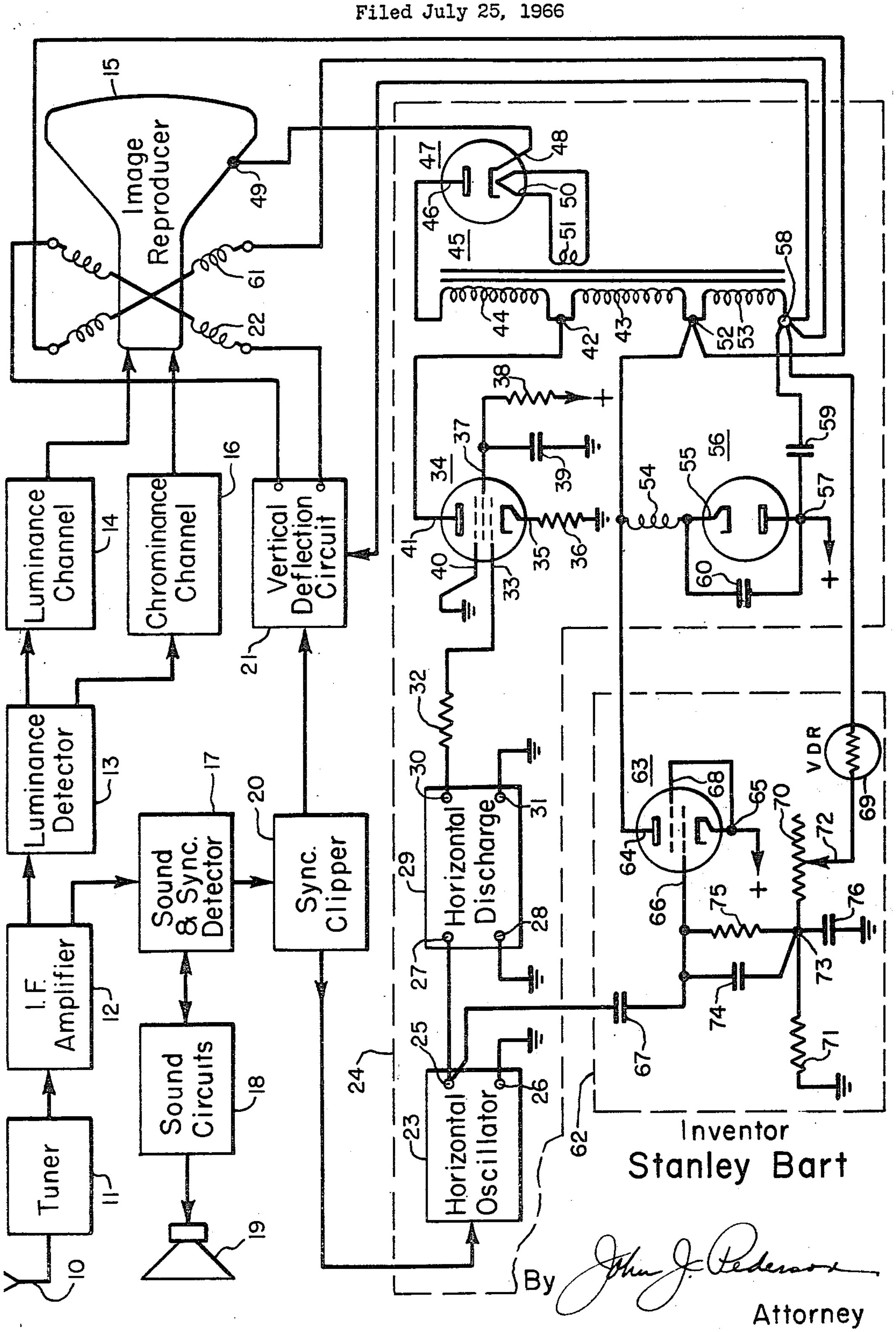
Inventor
Stanley Bart
By John J. Pederson
Attorney United States Patent Office 3,501,589
Patented Mar. 17, 1970

3,501,589

REGULATED POWER SUPPLY

Stanley Bart, Chicago, Ill., assignor to Zenith Radio Corporation, Chicago, Ill., a corporation of Delaware Filed July 25, 1966, Ser. No. 567,466
Int. Cl. H04n 3/18
U.S. Cl. 178—7.3 6 Claims

ABSTRACT OF THE DISCLOSURE

A regulated reaction-scanning type high voltage power supply for supplying accelerating potential to the cathode-ray tube of a television receiver. A regulator tube, shunt-connected across a portion of the primary winding of the horizontal output transformer, regulates the power supply by variably loading the transformer windings in response to changes in accelerating potential. Conduction of the regulator tube is limited to the first half cycle of the accelerating potential determining oscillation present in the transformer tertiary winding so as to have a minimal effect on the lower frequency scan-width determining flyback oscillation present in the primary winding.

The present invention relates to improvements in television receivers and more particularly to an improved regulated high voltage power supply for supplying accelerating potential to the cathode-ray tube image reproducer of a television receiver.

Cathode-ray tubes of the type commonly used for image-reproduction in present-day color television receivers require an accelerating potential in the order of 25,000 volts. Although accelerating potentials of this magnitude can be generated by a conventional power supply operable from the alternating-current line, for reasons of economy it has become standard practice to instead utilize a power supply excited by the output stage of the horizontal deflection system. Such sweep-excited high voltage power supplies, while offering economy by obviating the need for expensive transformers and filters, have characteristically poor voltage regulation under conditions of varying load. As a result, the accelerating potential developed by such a power supply when applied to a cathode-ray tube varies with the brightness level of the reproduced image.

Because the electron beam in cathode-ray tube image-reproducers becomes softer, or easier to deflect, at lower accelerating potentials, the size of the reproduced image increases with reductions in accelerating potential. Such size changes, accompanying brightness level variations in the reproduced image, are very annoying to viewers. Consequently, it has become a common practice to utilize regulator systems in conjunction with sweep-excited power supplies to maintain the accelerating potential applied to the image reproducer substantially constant in the face of brightness level variations, especially in color television receivers.

The regulator system now in almost universal use comprises a regulator tube shunt-connected across the high voltage output terminals of the receiver high voltage power supply. The conduction of this tube, and hence its loading effect on the power supply, is varied as a direct function of accelerating potential so that the high voltage power supply always operates into a constant predetermined load, and hence at a constant predetermined output potential, regardless of the brightness level of the reproduced image. The shunt-regulator system, while providing generally satisfactory regulation of accelerating potential, does have several serious deficiencies which have long prompted television receiver manufacturers to seek an alternative system. Its most serious deficiency is that it reduces the life of the high voltage regulator tube by causing it to operate continuously at a constant high current level. Another disadvantage is that it must be connected across the high voltage output terminals of the power supply, and hence requires elaborate and expensive radiation shielding and electrical insulation.

Prior-art attempts at overcoming the deficiencies of the shunt regulator have centered about the use of keyed or pulsed regulator systems wherein the regulator tube is allowed to conduct only during a predetermined portion of the retrace interval. These systems, however, have all had one or more deficiencies which prevented their use in consumer television receivers. For example, one of these systems, originally developed for use in monochrome receivers, utilized the receiver horizontal deflection amplifier as a regulator tube by applying gating pulses to its grid during a portion of the retrace interval. This resulted in an almost doubled plate dissipation requirement for the horizontal output tube, a requirement entirely unacceptable in the face of the already high plate dissipation requirement for this tube in present-day color receivers. In addition, this prior-art pulse system had the disadvantage of requiring a direct connection to the receiver high voltage power supply for sensing the accelerating potential being applied to the receiver image reproducer. Since present-day color television receivers require extremely high accelerating potentials, this connection would be difficult and expensive to make because of the need for elaborate electrical insulation.

It is a general object of this invention, therefore, to provide an improved high voltage regulator system for use with the sweep-excited high voltage power supply of a television receiver.

It is a more specific object of this invention to provide an improved high voltage regulator system which does not have a detrimental effect on the life-expectancy of the high voltage power supply.

It is a still more specific object of this invention to provide an improved and economical high voltage regulator system which does not require expensive shielding and insulation hardware incident to its use in a television receiver.

Accordingly, the invention is directed to a regulated power supply in a television receiver of the type having a cathode-ray tube requiring a high voltage direct current accelerating potential substantially constant over a predetermined range of brightness levels. The power supply comprises a deflection amplifier, and a reactive output circuit for the deflection amplifier comprising a sweep transformer having primary and secondary windings and a deflection yoke for deflecting the electron beam of the cathode-ray tube. Means including a wave signal generator are included for applying a signal to the deflection amplifier to periodically interrupt conduction therein, the periodic interruption producing a first oscillation in the primary winding and the deflection yoke to rapidly retrace the electron beam from one side of the reproduced image to the other, and a second higher-frequency oscillation in the secondary winding, the amplitudes of the oscillations being dependent upon the loading of the primary winding. Means are also included for rectifying the second oscillation to develop the direct current accelerating potential for the cathode-ray tube, the accelerating potential being undesirably dependent on the brightness level of the cathode-ray tube. Sensing means develop a control voltage dependent on the accelerating potential produced by the rectifying means, and means including an active electron control device shunt-connected across at least a portion of the primary winding and responsive to the control voltage variably load the primary winding in response to the voltage to maintain the accelerating potential substantially constant with brightness variations in the reproduced image. Means for preventing the electron control device from loading the secondary winding except during recurrent time intervals substantially corresponding to not more than the first quarter-cycle of the first oscillation minimize the effect of the loading on the first oscillation.

The features of the present invention which are believed to be novel are set forth with particularity in the appended claims. The invention, together with further objects and advantages thereof, may be best understood by reference to the following description taken in conjunction with the accompanying drawing, in which the single figure is a detailed schematic diagram of a television receiver having a high voltage regulator system in accordance with the invention.

The color television receiver illustrated in the figure comprises an antenna 10 coupled in a conventional manner to a tuner 11, which includes the usual radio frequency amplifying and heterodyning stages. The intermediate-frequency output of tuner 11 is coupled to an intermediate-frequency amplifier 12 which, in turn, is coupled to a luminance detector 13. The video-frequency output of luminance detector 13 is applied to a luminance channel 14, wherein it is amplified before application to image reproducer 15, which in this case is a standard three-gun shadow-mask color cathode-ray tube. The output of luminance detector 13 is also coupled to a chrominance channel 16 which includes appropriate color demodulator circuitry for deriving chrominance signals for application to color image reproducer 15.

The output of intermediate-frequency amplifier 12 is further coupled to a sound and sync detector 17, the output of which is coupled by conventional sound circuits 18 to a speaker 19. The output of detector 17 is also coupled to a sync separator 20 wherein synchronizing information in the form of vertical and horizontal sync pulses is derived from the received signal. The vertical sync pulses are coupled to vertical deflection circuit 21 wherein a synchronized vertical scanning signal is developed for application to the vertical deflection windings 22 of image reproducer 15.

Horizontal sync pulses from sync clipper 20 are coupled to a horizontal oscillator stage 23 which comprises part of the receiver horizontal deflection system 24 and includes appropriate circuitry for generating a synchronized horizontal-rate wave signal at output terminals 25 and 26. The synchronized wave signal is applied directly to the input terminals 27 and 28 of a horizontal discharge stage 29, terminals 25 and 27 being connected together and terminals 26 and 28 being grounded. Horizontal discharge stage 29 conditions and amplifies the applied horizontal-rate wave signal to develop a drive signal across output terminals 30 and 31. Terminal 30 is connected by an isolation resistor 32 to the control electrode 33 of a deflection amplifier device 34 and terminal 31 is grounded. The cathode electrode 35 of device 34 is connected by a cathode resistor 36 to ground and the screen electrode 37 is connected by a screen dropping resistor 38 to a positive source of uni-directional current. Screen electrode 37 is by-passed to ground by a capacitor 39 and the suppressor electrode 40 of device 34 is grounded.

The anode electrode 41 of device 34 is connected to a juncture 42 formed by one terminal of a primary winding section 43 and one terminal of a high voltage secondary or tertiary winding 44 on sweep transformer 45. The remaining terminal of tertiary winding 44 is connected to the anode electrode 46 of a high voltage rectifier 47. The cathode electrode 48 of rectifier 47 is connected to the ultor electrode 49 of image reproducer 15 and the filament 50 is connected across a winding 51 on sweep transformer 45.

The remaining terminal of primary winding section 43 is connected to a terminal of another primary winding section 53 at a juncture 52. Juncture 52 is connected through an inductance 54 to the cathode electrode 55 of a uni-directional device 56, the conventional damper diode. Anode electrode 57 of device 56 is connected to a positive unidirectional source and to the remaining terminal of secondary winding 53, juncture 58, by a capacitor 59. A capacitor 60 is connected between the cathode electrode 55 and the anode electrode 57 of device 56. The horizontal deflection windings 61 of image reproducer 15 are connected across winding 53 at junctures 52 and 58. Juncture 58, which comprises a source of boost potential for the receiver, is connected to vertical deflection circuit 21 for which it serves as a source of unidirectional operating current in a manner well known to the art.

As thus far described the receiver is entirely conventional in design, and accordingly only a brief description of its operation need be given here. A received signal is intercepted by antenna 10, then amplified and translated to an intermediate-frequency by tuner 11. After amplification by intermediate-frequency amplifier 12, the signal is translated to a composite video-frequency signal by luminance detector 13. The luminance component of the translated composite signal, which represents elemental brightness information in the televised image, is amplified in luminance channel 14 and applied to image reproducer 15. The chrominance component, after demodulation and amplification in chrominance channel 16, is applied in the form of color-difference signals to image reproducer 15. The concurrently applied luminance and color-difference signals matrix in image reproducer 15 to produce an image having brightness, hue and color saturation characteristics corresponding to the televised image. The amplified intermediate-frequency signal from intermediate-frequency amplifier 12 is also applied to sound and sync detector 17, wherein a composite video-frequency signal is derived which includes sound and synchronizing components. Sound information from this composite signal is applied to sound circuits 18, wherein conventional sound demodulation and amplification circuitry is utilized to develop an audio output signal for application to speaker 19.

Synchronizing information, in the form of horizontal and vertical sync pulses, is separated from the composite signal by sync clipper 20. Vertical deflection circuit 21 utilizes the vertical sync pulses to generate a synchronized vertical scanning signal in vertical deflection winding 22. As has become standard practice, vertical deflection circuit 21 utilizes the receiver unidirectional boost-supply source as a source of positive unidirectional current. Horizontal synchronizing information from sync clipper 20 is applied to horizontal oscillator stage 23, which is part of the receiver horizontal deflection system 24. This stage includes a sine-wave oscillator and appropriate reactance control circuitry for producing a horizontal-rate wave signal synchronized to the received television transmission at output terminals 25 and 26. Horizontal discharge stage 29 amplifies and conditions the horizontal-rate wave signal to generate a drive signal at output terminals 30 and 31 appropriate for controlling the operation of horizontal deflection amplifier device 34. The drive signal is coupled through resistor 32, which serves only as an isolation impedance, to control electrode 33 of deflection amplifier device 34. Device 34 is energized by a positive unidirectional source through an output circuit serially comprising primary winding 43, inductance 54, and rectifier device 56. Resistor 36 serves as a cathode bias resistor to develop operating bias for device 34 and resistor 38 serves as a conventional screen dropping resistor. Capacitor 39 functions as a screen by-pass capacitor at the horizontal scanning frequency.

The nature of the drive signal applied to control electrode 33 is such as to allow device 34 to achieve its maximum conduction immediately prior to the retrace interval in the received television transmission. As the voltage at control electrode 33 increases a current of increasing amplitude is caused to flow through transformer winding 43 producing a flow of current in winding 53 and deflection winding 61. When the current through deflection winding 61 and winding 53 reaches a maximum, the energy stored in the magnetic field surrounding winding 61 is at a maximum. At this instant the voltage applied to control electrode 33 is driven negative very rapidly and device 34 is rendered non-conductive. The result of the sudden termination of current flow through winding 43 is to cause the magnetic fields surrounding winding 53 and the deflection winding 61 to suddenly collapse. The collapsing field initiates an oscillation in the equivalent tuned circuit consisting of deflection winding 61, transformer secondary winding 53, capacitors 59 and 60 and the distributed stray and fixed capacities of the deflection circuit.

The current through deflection winding 61 reverses during the first quarter cycle of this oscillation and rises a maximum in the reverse direction at the end of the second quarter cycle of oscillation. The rapid rate of change of current through the deflection coil 61 initiated by sudden cutoff of device 34, constitutes the flyback or retrace period during which the scanning beam of image reproducer 15 is rapidly returned from the right edge to the left edge of the raster.

During the aforementioned half-cycle flyback oscillation, the energy in the deflection circuit flows out of the magnetic fields into the circuit capacitances and back into the magnetic fields with some loss because of inherent resistances of the circuit components. The counter EMF developed during this first portion of retrace is applied to device 56 through inductance 54 and capacitor 59, and is of such a polarity as to render the cathode 55 of device 56 positive with respect to anode 57, so that device 56 does not conduct and has no loading effect on the oscillation. However, at the end of the first half-cycle of oscillation the potential applied to device 56, as a result of attempted continuation of oscillation, is such as to cause device 56 to conduct and damp out subsequent oscillations in deflection winding 61. As a result, the energy stored in the magnetic field of deflection winding 61 causes a linearly decaying current through winding 53 and deflection winding 61 and the scanning beam slowly returns to the center of the raster. Deflection amplifier device 34 begins conduction slightly before the middle of this scanning trace to produce further deflection of the beam towards the right edge of the raster and subsequent repetition of the above-described cycle of operation.

The sudden termination of current flow at the beginning of the retrace interval also generates a harmonic oscillation in high voltage tertiary winding 44. The resulting alternating voltage is rectified by high voltage rectifier device 47 to generate an accelerating potential of approximately 25,000 volts at ultor electrode 49 of image reproducer 15. Winding 51 is included for energizing the heater 50 of electron discarge device 47 and the internal capacity of image reproducer 15 supplies the necessary capacitive filtering.

In accordance with the invention, the receiver illustrated in the figure includes a novel regulating system 62 for achieving regulation of the accelerating potential applied to image reproducer 15. The regulator system comprises an active electron control device 63 having an anode electrode 64 connected to juncture 52 and a cathode electrode 65 connected to a positive uni-directional operating potential source. The control electrode 66 of device 63 is connected by a capacitor 67 to terminal 25 of horizontal oscillator stage 23 and the suppressor electrode 68 of device 63 is connected to cathode electrode 65. Regulator system 62 further comprises a voltage divider network interconnected between juncture 58 and ground which serially comprises a voltage dependent resistor 69, a potentiometer 70 and a resistor 71. Voltage dependent resistor 69 is connected to the arm 72 of potentiometer 70 and potentiometer 70 and resistor 71 connect at a juncture 73. Juncture 73 is connected to control electrode 66 by the parallel combination of a capacitor 74 and a resistor 75 and is by-passed to ground by a capacitor 76.

Regulator system 62 accomplishes regulation of the accelerating potential applied to image reproducer 15 by variably loading tertiary winding 44 during the first quarter cycle of the third harmonic oscillation induced in that winding. The effect of increased loading is to reduce the amplitude of the initial high voltage pulse induced in the teritary at the beginning of retrace and hence reduce the potential at ultor electrode 49. Because of the high potential appearing on teritary winding 44, electron control device 63 is not connected directly to winding 44 but rather is connected across secondary winding 53 and the mutual inductance between the two windings is relied upon to transfer the loading effect.

During the retrace interval juncture 52 is positive with respect to juncture 58, so that a positive potential difference is applied between anode 64 and cathode 65 of electron control device 63. It will be appreciated that the conduction of device 63 during this interval is dependent on the effective bias existing between control electrode 66 and cathode electrode 65, and that this bias depends on the potential existing at juncture 73, which in turn is dependent on both the position of arm 72 and the instantaneous boost potential developed at juncture 58. Since the boost potential varies directly with the accelerating potential generated by the power supply, it follows that the potential at juncture 73, and hence the bias on control electrode 66, is a direct function of the accelerating potential applied to image reproducer 15. As the accelerating potential becomes greater, the potential at juncture 73 increases and the effective negative grid-cathode bias applied to device 63 decreases.

The values of voltage divider elements 69, 70 and 71 are chosen so that the potential at juncture 73 is just sufficient to reduce the grid-cathode bias of device 63 below cut-off. This allows device 63 to be gated into conduction by a gating pulse derived from terminal 25 of horizontal oscillator stage 23 and applied to control electrode 66 by coupling capacitor 67.

It will be recalled that the signal appearing across output terminals 25 and 26 of horizontal oscillator stage 23 consisted of a horizontal-rate wave signal locked in synchronism to sync pulses from the received television transmission. This horizontal-rate wave-signal, when superimposed on the potential existing at juncture 73, effectively becomes a gating pulse which allows device 63 to conduct only during a very short period corresponding to the first half of the retrace interval. Of course, the amount of conduction of device 63 during this period is dependent on the bias from juncture 73, and any increase in boost potential will be offset by heavier conduction of device 63 and heavier loading of tertiary winding 44. The period of conduction of device 63 corresponds to not more than the first half cycle of the harmonic oscillation induced in tertiary winding 44, so that device 63 controls primarily the amplitude of the initial high voltage pulse developed on tertiary winding 44. The developed accelerating potential is almost entirely dependent on the amplitude of this pulse, and any conduction in device 63 during this short interval has a marked effect on the direct current accelerating potential on ultor electrode 49. It should be noted, however, that the operation of device 63 has only a slight effect on the generation of scanning current in deflection winding 61. This is because the operation of device 63 is limited by the gating pulse to less than one-half cycle of the tertiary oscillation, which corresponds to the first half of the retrace interval, or less than one-quarter cycle of the lower-frequency primary oscillation. Absent this gating feature, the width of the reproduced image would vary excessively with changes in regulator conduction.

Capacitors 67 and 74 and resistor 75 cooperate to form a wave shaping network for the applied gating pulse. Resistor 75 also functions to impress the positive potential of juncture 73 on control electrode 66 and capacitor 76 serves as a by-pass for any A.C. ripple occurring at juncture 73.

The incorporation of voltage dependent resistor (VDR) 69 in the voltage divider network has the effect of increasing the voltage variation impressed on control electrode 66 for a given variation in boost voltage over that which would be present with an equivalent voltage divider of fixed resistors. This follows because of the non-linear voltage-resistance characteristic of resistor 69, which causes a constant voltage drop to be maintained across resistor 69. Any variation in the boost potential at juncture 58 is therefore impressed across potentiometer 70 and resistor 71 only, and the effective division of this variation is that of these two elements only, not that of the total three element voltage divider.

Of particular significance in the inventive regulator circuit is the fact that electron control device 63 is connected across secondary winding 53 instead of the high voltage tertiary winding 44. Because winding 53 is a low voltage winding, no elaborate and expensive precautions need be taken in the regulator system as to electrical insulation and radiation shielding. Furthermore, regulator system 62 does not require a direct connection to the high voltage output of the power supply, but instead makes use of an existing boost potential, present in practically all television receivers, to sense variations in the accelerating potential. A direct connection to the 25,000 volt output circuit would, at best, be difficult and expensive because of the special electrical insulation problems involved.

The use of the voltage dependent resistor as one element of this voltage divider offers a significant advantage in allowing the use of a single inexpensive potentiometer for adjustment of the developed bias potential. Not to be overlooked is the fact that electron control device 63 is gated into conduction only during the first half of the retrace interval. This prevents the operation of device 63 from interfering with the generation of the sawtooth deflection current in horizontal winding 61.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. In a television receiver of the type having a cathode-ray tube requiring a high voltage direct current accelerating potential to be held substantially constant over a predetermined range of brightness levels, a regulated power supply comprising:

a horizontal deflection amplifier;

a reactive output circuit for said deflection amplifier comprising a horizontal sweep transformer having a primary winding driven by said deflection amplifier and a deflection-output secondary winding and further compirsing a deflection yoke coupled to said secondary winding for deflecting the electron beam of said cathode-ray tube, said sweep transformer further including a high-voltage tertiary winding connected to said primary winding;

means including a wave signal generator for applying a horizontal-rate signal to said deflection amplifier to periodically interrupt conduction therein, said periodic interruption producing a first oscillation in said primary winding and deflection yoke to rapidly retrace said electron beam from one side of the reproduced image to the other, and a second higher-frequency oscillation in said tertiary winding, the amplitudes of said oscillations being dependent on the loading of said primary winding;

means including a high-voltage rectifier coupled to said tertiary winding for rectifying said second oscillation to develop said direct current accelerating potential for said cathode-ray tube, said accelerating potential being undesirably dependent on the brightness level of said cathode-ray tube;

sensing means for developing a control voltage dependent on the accelerating potential produced by said rectifying means;

means including an active electron control device shunt-connected across said deflection-output secondary winding and having a control electrode coupled to said control voltage developing means for variably loading said primary winding in response to said control voltage to maintain said accelerating potential substantially constant with brightness variations in said reproduced image;

and horizontal-rate gating means for preventing said electron control device from loading said primary winding except during recurrent time intervals substantially corresponding to not more than the first quarter-cycle of said first oscillation to control the amplitude of said second oscillation while minimizing the effect of said loading on said first oscillation.

2. A regulated power supply as described in claim 1 wherein said gating means comprises means for preventing said electron control device from loading said secondary winding except during recurrent time intervals substantially corresponding to not more than the first half-cycle of said second oscillation.

3. A regulated power supply as described in claim 1 wherein said active electron control device has a control electrode and a pair of principal electrodes, said principal electrodes being connected directly across said deflection-output secondary winding, and wherein said gating means comprises a source of control pulses and a translating circuit for coupling said pulse source to said control electrode.

4. A regulated power supply as described in claim 3 wherein said source of control pulses is said wave signal generator.

5. A regulated power supply as described in claim 4 wherein said means for variably loading said primary winding comprises means for applying said control voltage to said control electrode, and wherein said pulse translating circuit serially includes a direct-current blocking capacitor.

6. A regulated power supply as described in claim 5 wherein said means for variably loading said primary winding includes means for shaping said control pulses to substantially restrict loading of said primary winding to an interval substantially corresponding to not more than one-fourth cycle of said first oscillation.

References Cited

UNITED STATES PATENTS

| | | | |
|---|---|---|---|
| 2,948,776 | 8/1960 | Kraft. | |
| 3,072,741 | 1/1963 | Ahrons et al. | |
| 3,202,865 | 8/1965 | Stark | |
| 3,217,236 | 11/1965 | Alma et al. | 315—27 |
| 3,346,763 | 10/1967 | Stark | |
| 3,350,599 | 10/1967 | Rickling | 315—27 |
| 3,395,311 | 7/1968 | Hursh | 315—22 |

ROBERT L. GRIFFIN, Primary Examiner

ALFRED H. EDDLEMAN, Assistant Examiner

U.S. Cl. X.R.

315—27